United States Patent [19]
Christensen

[11] Patent Number: 5,457,585
[45] Date of Patent: Oct. 10, 1995

[54] TAPE EDGE DETECTOR USING OFF TAPE AND ON TAPE MR NOISE

[75] Inventor: Eric R. Christensen, Tucson, Ariz.

[73] Assignee: International Business Machines Corporation, Armonk, N.Y.

[21] Appl. No.: 231,420

[22] Filed: Apr. 22, 1994

[51] Int. Cl.[6] ............................................. G11B 21/12
[52] U.S. Cl. ................................... 360/75; 360/78.02
[58] Field of Search .................. 360/75, 77.12, 360/78.02

[56] References Cited

U.S. PATENT DOCUMENTS

| | | | |
|---|---|---|---|
| 4,390,917 | 6/1983 | Watanabe | 360/128 |
| 4,476,503 | 10/1984 | Solhjell | 360/75 |
| 4,611,249 | 9/1986 | McClure | 360/77 |
| 4,786,984 | 11/1988 | Seeman | 360/31 |
| 4,802,030 | 1/1989 | Henry et al. | 360/60 |
| 4,977,468 | 12/1990 | Aruga et al. | 360/75 |
| 5,111,347 | 5/1992 | Ono et al. | 360/75 |
| 5,299,074 | 3/1994 | Sukigara et al. | 360/75 |

*Primary Examiner*—Aristotelis Psitos
*Assistant Examiner*—James L. Habermehl
*Attorney, Agent, or Firm*—Baker, Maxham, Jester & Meador

[57] ABSTRACT

A magnetic tape edge detector is provided which detects the edge of the tape by processing the noise power produced by an MR element when it is completely off the tape and the noise power produced by the MR element when it is completely on the tape. The off tape noise power is produced by factors intrinsic to the MR element and circuitry connected thereto, while the on tape noise power is produced by the heating of the MR element due to friction between moving magnetic tape and the MR element. The difference between the off tape noise power and the on tape noise power is divided by an integer greater than one to produce a reference noise signal. The reference noise signal represents a reference position of the MR element with respect to the edge of the tape. For instance, if the integer is two the MR element is at its reference position when the edge of the tape bisects the width of the MR element. The magnitude of off tape noise power is directly related to the width of the MR element. Once the reference position is detected the MR element or a plurality of interconnected MR elements can be indexed to desired information or servo tracks on the magnetic tape.

26 Claims, 6 Drawing Sheets

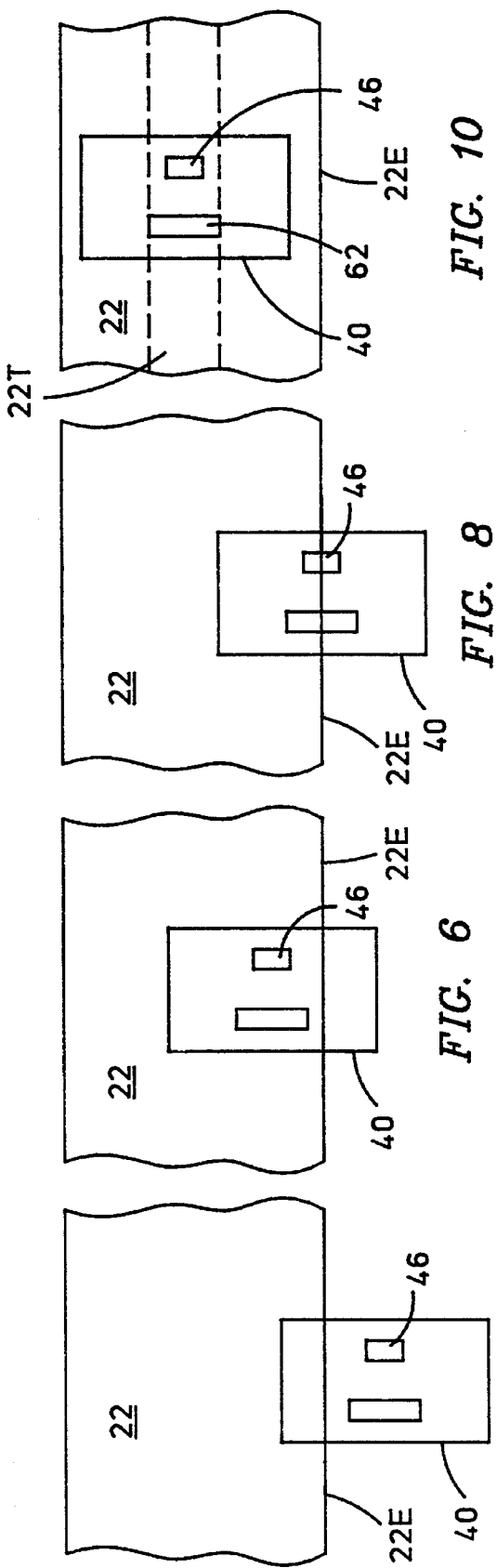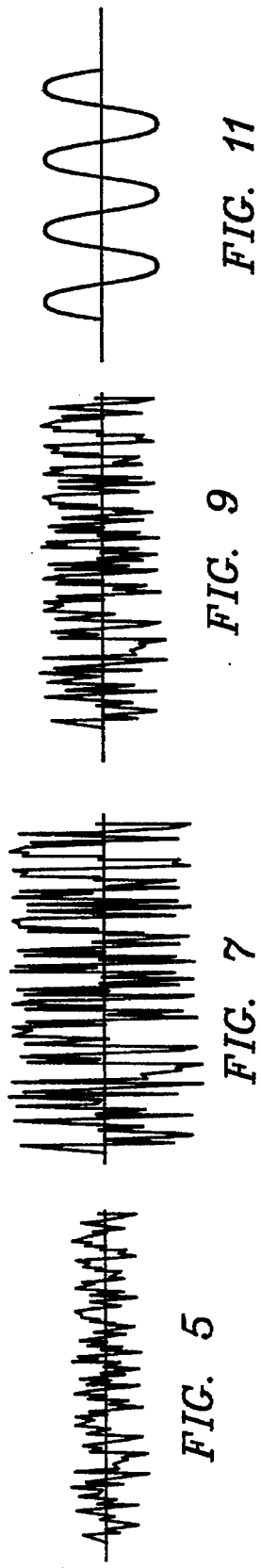

TAPE EDGE DETECTOR USING OFF TAPE AND ON TAPE MR NOISE

BACKGROUND OF THE INVENTION

1. Field of the Invention

The present invention relates to a detector which utilizes noise generated by a magnetoresistive (MR) element adjacent a magnetic tape for locating an edge of the magnetic tape.

2. Description of the Related Art

A magnetic tape drive employs a magnetic head to write and read data with respect to one or more tracks on a magnetic tape. The edge of the magnetic tape is employed as a reference for establishing or finding a track, whether the track be a data track or a servo track. In the prior art, a typical multi-track magnetic tape is a quarter-inch tape with eight tracks on it. The edge of the tape is positioned within the drive by a guide which occupies a precisely known position with respect to the location of the magnetic head. When the tape is placed in the drive, the tape edge is positioned by the guide and the head is moved a predetermined distance from a known position onto the tape to selected track positions. This arrangement works well for relatively low track densities, such as 32 tracks per inch (TPI). However, it is insufficiently precise to consistently and accurately locate a small head (3–4 µm) with respect to a very narrow track in a high TPI environment.

In order to locate information and servo tracks with repeatable accuracy when track density is high, numerous new arrangements have been proposed for accurately determining the edge of a magnetic tape. Most of these proposed arrangements employ a write transducer to write a control track along an edge of the tape, a read transducer to read signals in the control track, and a device for comparing the signal read with a predetermined reference signal to determine the edge of the tape. The following U.S. Pat. Nos. embody this basic technique: 5,111,347; 4,977,468; 4,611,249; 4,476,503; 4,786,984; and 4,802,030. In the last U.S. Pat. No. , 4,802,030, the noise read by the transducer is considered to be a problem and the patent teaches establishing and detecting a reference signal which has an amplitude greater than the noise for finding the edge of the tape. As will become clear hereinafter, the present invention does not treat the noise picked up by the read transducer as a problem, but instead utilizes the noise as a solution for detecting the edge of the magnetic tape.

A narrow track read transducer typically employs a magnetoresistive (MR) element sandwiched between thin film gap and shield layers. In operation, a sense current is transmitted through the MR element, with appropriate bias, to establish the element's quiescent state. When the read transducer engages a moving magnetic tape, magnetic fields from the tape vary the sense current and resistance of the MR element. This variation generates the readback signal and is detected by a differential amplifier connected across the MR element. The MR element also produces a slight amount of inherent noise when it is off the tape. When the MR element is on the tape, friction between the MR element and the moving magnetic tape increases the temperature of the MR element, causing the MR element to produce a marked increase in its noise level. While the prior art has always considered the off tape and on tape noise to be undesirable, it is actually beneficially employed by the present invention to find the edge of the magnetic tape.

SUMMARY OF THE INVENTION

The present invention employs a read transducer which has an MR element. In a tape drive, the read transducer undergoes frictional engagement with a magnetic tape when the magnetic tape is moved for write and/or read functions. This contact creates heat within the MR element which increases its resistance. This change in resistance generates a noise voltage that is measured by a differential amplifier connected across the MR element. It has been found that for a 2 m/sec. head tape velocity this noise voltage is greatest within a narrow frequency bandwidth of about 0.5 to 1.0 MHz, which, after integration, can be referred to as "slot noise power". Such noise is intrinsic to the MR element and its associated circuitry. Indeed, even when the MR element is out of contact with the tape, the MR element produces a small amount of noise power within this bandwidth. A differential slot noise power can be determined between the "on tape" and "off tape" slot noise power levels. In this regard, the "on tape" level is measured when the MR element is in frictional contact with a moving tape. The "off tape" level is the intrinsic level measured when the element is out of contact with tape. In one test, it was found that this difference was approximately 12 dB. An important factor is that the on tape slot noise power is linearly proportional with respect to the width of the MR element that is on the tape. For instance, if one half of the width of the MR element is on the tape, the differential slot noise power will be one half of what it would be if the entire width of the MR element were on the tape.

In a preferred embodiment of the invention, an MR element is moved completely off and then completely on a moving magnetic tape to acquire off tape and on tape slot noise power levels. The difference between these slot noise power levels is divided by some factor greater than one to provide a reference slot noise power level. The MR element is then moved onto the tape until the level of its slot noise power is equal to the level of the reference slot noise power. Knowledge of the width of the MR element permits the use of a linear relationship between MR displacement and integrated slot noise power to determine the edge of the tape. Once the reference position is known, the read transducer with the MR element and/or a write transducer can be indexed from the known edge of the tape to any desired track or tracks on the tape. Other embodiments can be employed utilizing the present invention such as a stepping motor for positioning the MR element until a maximum noise power is detected. The invention would also be usable for magnetic media other than magnetic tape, such as magnetic disks.

With the present invention, it is not necessary to write a control track adjacent the edge of a magnetic tape and then read the control track with a read transducer for determining the location of the tape edge. The invention simply uses the noise generated between the MR element and the moving magnetic tape for initializing a tape drive each time a tape is inserted in the drive. Also, when the tape is removed and placed in another tape drive, the same initializing step will take place to detect the edge of the tape, thereby establishing uniformity between all tape drives that employ the present invention.

An object of the present invention is to detect the edge of a magnetic medium without first writing a control track on the magnetic medium.

Another object is to provide a device which employs thermal noise generated in an MR element by friction with a moving magnetic tape for detecting the location of the edge of the magnetic tape.

3

A further object is to employ the difference between off tape slot noise power and on tape slot noise power of an MR element for detecting the edge of the tape.

Yet another object is to provide an apparatus and method for accurately positioning or indexing a magnetic transducer to a desired track or tracks on a magnetic tape.

Other objects will become when considered in light of the following description of the invention.

BRIEF DESCRIPTION OF THE DRAWINGS

FIG. 4 is a schematic illustration of a magnetic head with an MR element showing the MR element completely off a magnetic tape.

FIG. 5 shows an exemplary noise signal produced by the MR element of FIG. 4.

FIG. 6 is a schematic illustration of a magnetic head with an MR element showing the element located completely on a moving magnetic tape.

FIG. 7 shows an exemplary noise signal produced by the MR element in FIG. 6.

FIG. 8 is a schematic illustration of a magnetic head with an MR element showing the element located where the edge of the tape bisects the width of the MR element.

FIG. 9 shows an exemplary noise signal produced by the MR element of FIG. 8.

FIG. 10 is a schematic illustration of a magnetic head with an MR element showing the element centered over a desired track on the moving magnetic tape.

FIG. 11 shows exemplary data read by the MR element in FIG. 10.

DESCRIPTION OF THE PREFERRED EMBODIMENTS

Figure 1:
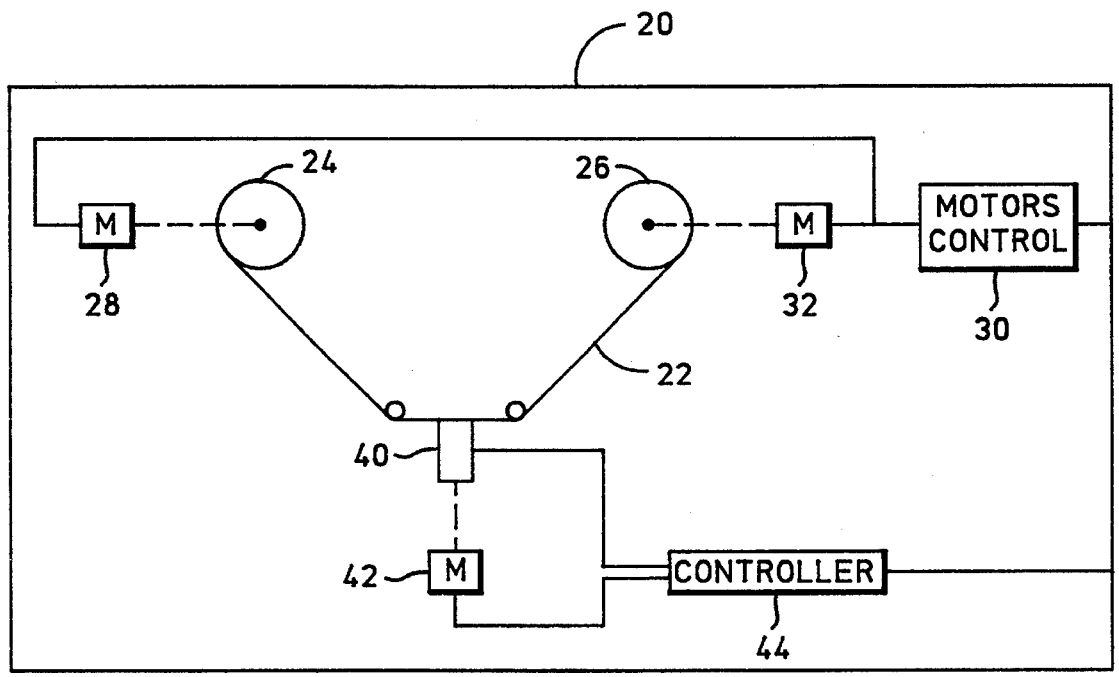
FIG. 1 is a schematic illustration of a magnetic tape drive.

Referring now to the drawings, wherein like reference numerals designate like or similar parts throughout the several views, there is illustrated in FIG. 1 a magnetic tape drive 20 which may include a magnetic tape 22, the magnetic tape 22 being driven between a pair of reels 24 and 26. The reel 24 may be operated by a motor 28 which is controlled by motor control 30 and the reel 26 may be operated by a motor 32 which is also controlled by the motor control 30. A magnetic head 40 engages and disengages the magnetic tape 22 and is capable upon engagement of writing and/or reading the tape. A motor 42 is connected to the head 40 for positioning the head, and the head 40 and the motor 42 are connected to a controller 44 for controlling the motor as well as processing signals to and from the magnetic head 40.

Figure 2:
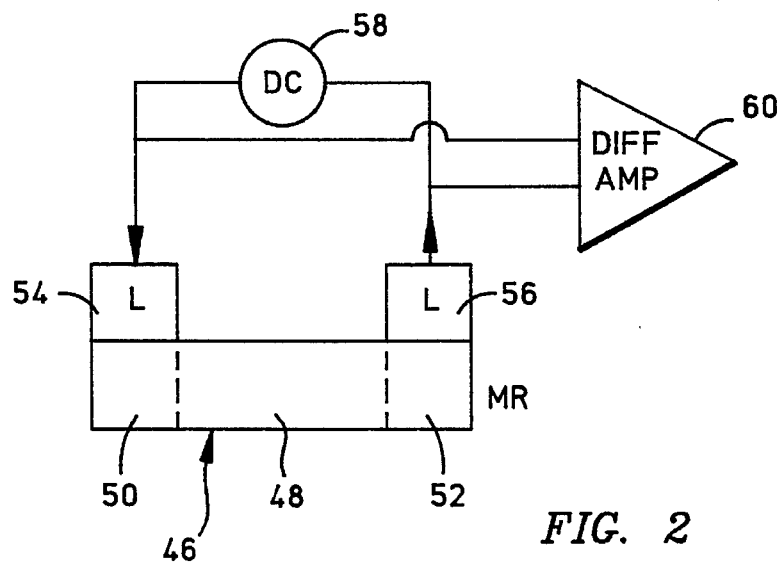
FIG. 2 is a schematic illustration of an MR element or stripe receiving a sense current and outputting a differential voltage.

FIG. 2 is a schematic illustration of an MR element 46 included in the head 40. The MR element is a thin film which is sandwiched between thin film gap layers (not shown), which in turn are sandwiched between first and second thin film shield layers (not shown). For a detailed description of an MR element used as a read transducer, refer to commonly assigned patent application of Heim and Gill, Ser. No. 08/103,487, which is incorporated by reference herein. The MR element has an active portion 48, which is located between inactive portions 50 and 52. The inactive portions 50 and 52 are rendered inactive to magnetic flux incursions by the connection of leads 54 and 56 thereto. The leads 54 and 56 are connected to a DC source 58, which transmits a DC sense current through the active portion 48 of the MR element. The MR element is typically constructed of Permalloy, which is NiFe. When a magnetic field from a tape reaches the MR element, the resistance of the active portion changes proportionally to the strength of the field. A corresponding change in voltage occurs between the leads 54 and 56. Voltage changes are detected by a differential amplifier 60 connected across the leads 54 and 56.

Figure 3:
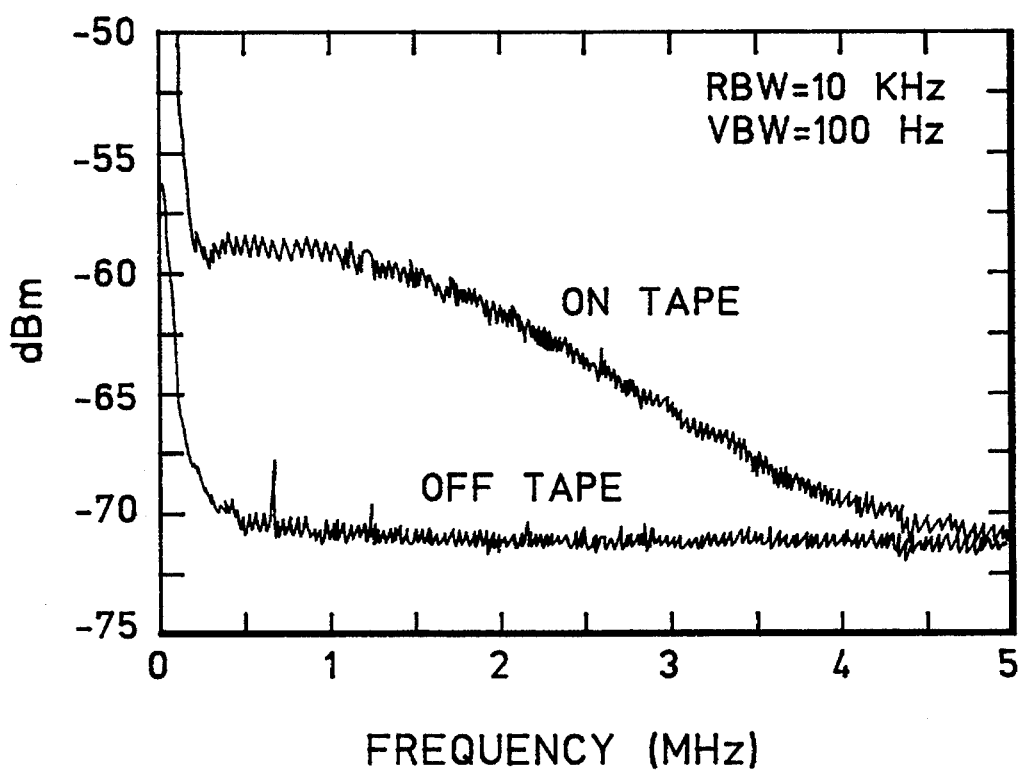
FIG. 3 is a graph illustrating off tape and on tape power in dBm detected by a spectrum analyzer versus frequency in MHz.

The prior art has relied upon reading flux incursions at the edge of a tape for determining the location of the MR element with respect to the edge of the tape. The present invention, however, relies upon another phenomenon of the MR element. This phenomenon is the change in resistance of the MR element due to temperature changes caused by heating of the MR element when it is in contact with a moving magnetic tape. When the MR element is completely on a moving magnetic tape, friction therebetween heats the MR element, causing an increase in resistance, which produces a noise voltage at the differential amplifier 60. When the MR element is completely off the tape, the magnitude of this noise voltage is small and is due to intrinsic characteristics of the MR element plus circuitry connected thereto. FIG. 3 best illustrates this phenomenon, which the invention embraces as a benefit rather than treating as a detriment.

FIG. 3 illustrates graphs of on tape noise power (integrated noise voltage) and off tape noise power of an MR element in dBm versus frequency in MHz from 0 to 5 MHz. The on tape power is derived from the magnitude of the noise voltage measured across an MR element when the bearing surface of the element is entirely on a moving tape. The off tape power is measured when the bearing surface is entirely out of contact with tape. As stated hereinabove, the off tape noise power is intrinsic, while the on tape noise power is due to rubbing friction of the moving magnetic tape with the MR element. It should be noted that the differential noise power is at a maximum of about 12 dBm within a frequency range of approximately 0.5 MHz to 1.0 MHz. This is referred to as "slot noise". Assuming that the maximum on tape slot noise power is about −60 dBm when the MR element is completely on a moving tape, a mid-slot noise power level of −63 dBm would occur precisely when the edge of the tape bisects the width of the MR element, because the amount of heat generated by friction between the magnetic tape and the MR element is linearly proportional to the width of the MR element contacted by the magnetic tape. Accordingly, when the MR element is halfway on the moving magnetic tape, the MR element generates a slot noise power level which is ½ the maximum slot noise power level generated when the MR element is fully on the moving magnetic tape. The graph in FIG. 3 was obtained with a spectrum analyzer, which has a resolution bandwidth (RBW) of 10 kHz and a video bandwidth (VBW)

of 100 Hz. The width of the MR element was 35 μm and the relative head-to-tape velocity was 2.0 meters/second. The MR element sense current was 12.5 mA and the tape was a conventional metal-particle type. It should be understood that the invention does not respond to heating of the tape due to tape asperities, which cause large thermal voltage spikes and which may be eliminated by electronic filtering. The invention simply relies upon the heating of the MR element due to rubbing friction of the moving magnetic tape therewith. It should also be understood that the invention will operate substantially independent of variables such as tape roughnesses, and atmospheric conditions, such as room temperature and drive temperature.

FIGS. 4, 6, 8 and 10 are schematic illustrations of the relative positions of the magnetic head 40 (with the MR transducer 46) and the tape 22. FIGS. 5, 7 and 9 show noise voltage as measured by the MR element 46. In FIG. 4, the magnetic head 40 is located such that the MR element 46 is completely off the tape 22. A representative intrinsic noise signal produced by the MR element 46 is illustrated in FIG. 5. In FIG. 6, the magnetic head 40 has been moved to place the MR element 46 completely on the tape which will produce a much larger noise signal, as illustrated in FIG. 7. FIG. 8 shows the magnetic head 40 positioned with the edge 22E of the moving magnetic tape 22 bisecting the width of the MR element 46 as shown. The power illustrated in FIG. 9 is one half of the differential between the off and on powers of FIGS. 5 and 7. It should be understood that the MR element 46 can be placed in any location which establishes its noise power output somewhere between the off tape power level and the on tape power level shown in FIGS. 5 and 7. After the position of the MR element 46 is known with respect to a reference position, as illustrated in FIG. 8, it can be indexed to any desired data or servo track 22T as illustrated in FIG. 10. This is because the distance from the edge 22E of the tape 22 to one or more tracks on the tape is known. Assuming that a write head 62 has written data and the MR element 46 is performing a read or write verify, an exemplary data output is illustrated in FIG. 11 (not to scale with respect to FIGS. 5, 7 and 9).

Figure 12:
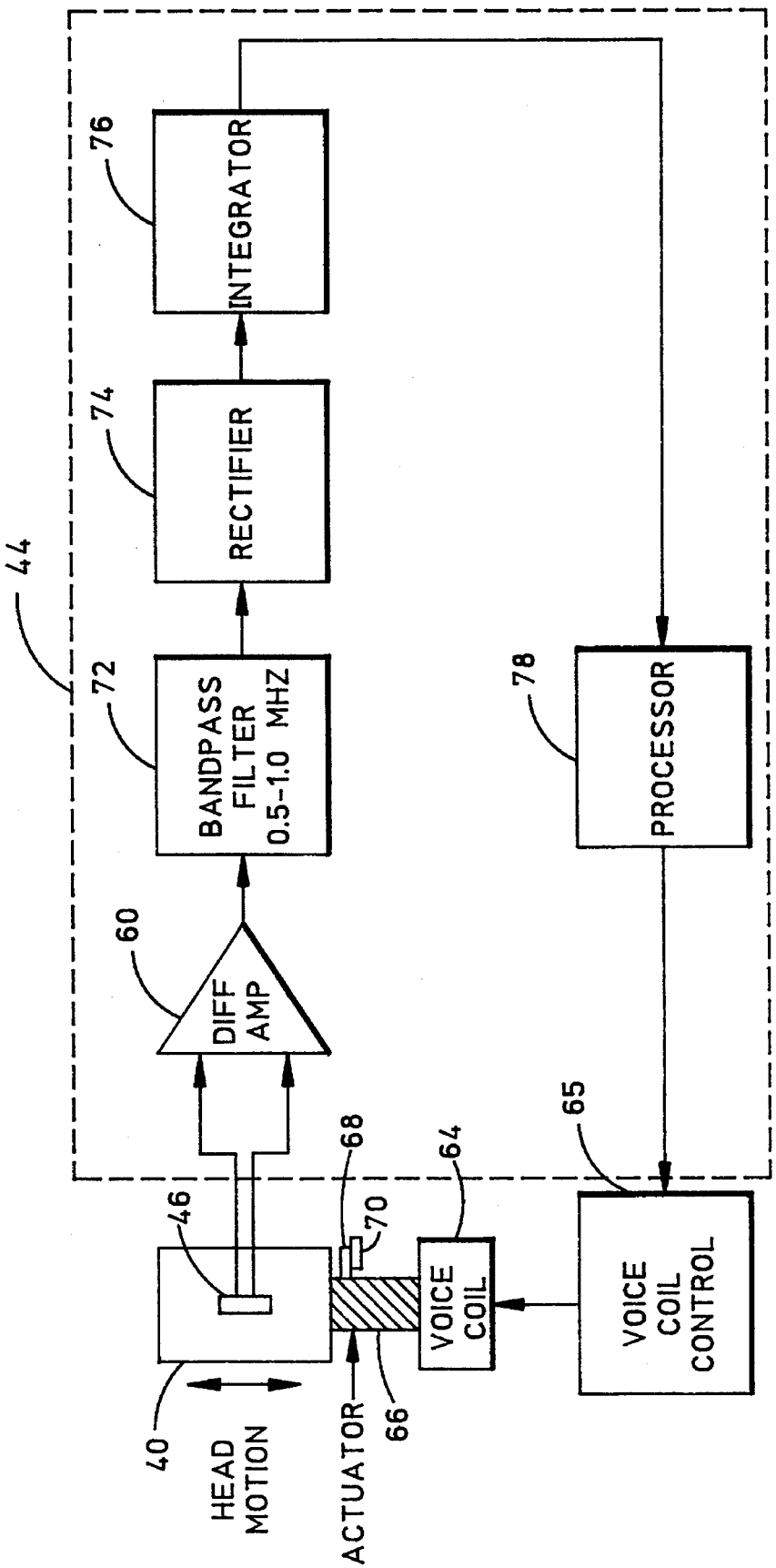
FIG. 12 is a schematic illustration of exemplary circuitry for positioning the magnetic head so that the MR element can be located in a known position with respect to the edge of the magnetic tape.

In FIG. 12, there is shown an apparatus for positioning a head with an MR element with respect to an edge of a tape. The apparatus includes a voice coil 64, which is connected to the magnetic head 40 via an actuator 66. The voice coil 64 is capable of linearly moving the actuator 66 in response to signals from a voice coil control 65 so that the head 40 can be moved back and forth linearly across the width of the tape 22. The actuator may have a transverse projection 68, which is engageable with a stop 70 for establishing a home or crash stop position of the head 40 within the tape drive. This can also be the position where the MR element 46 is completely off the tape so as to make an off tape noise voltage reading.

Figure 13:
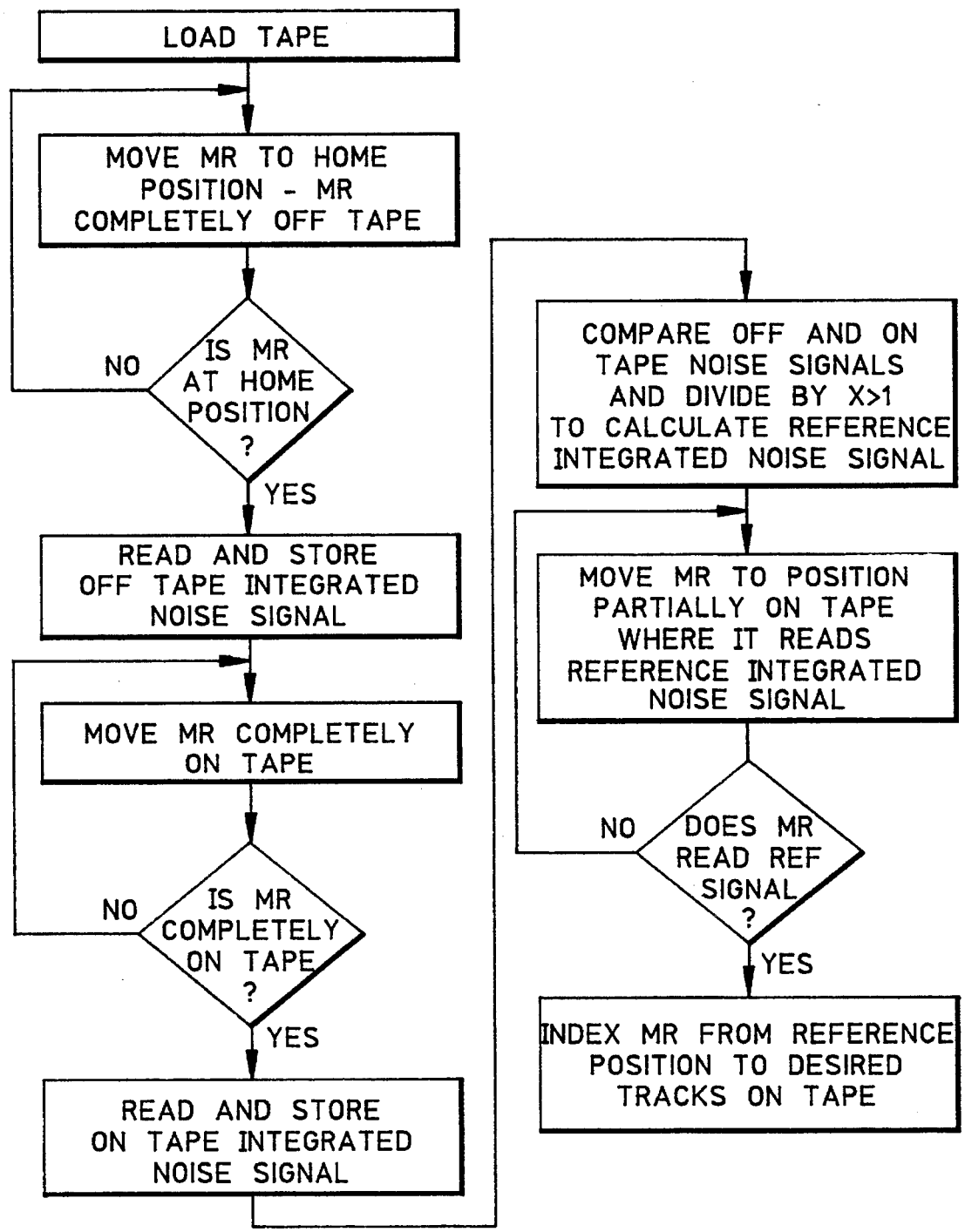
FIG. 13 is an exemplary flow diagram for the processor of FIG. 12.

FIG. 12 also illustrates a preferred controller 44 for activating the voice coil control 65 in response to signals from the MR element 46. The off tape noise voltage reading is detected by a differential amplifier 60, which is connected across the leads of the MR element 46, as illustrated in FIG. 2. This off tape noise voltage is received by a bandpass filter 72, which may operate between 0.5 to 1.0 MHz. This provides a slot noise voltage within this bandwidth which is received by a rectifier 74. The output of the rectifier is integrated by an integrator 76, which sums the off track slot noise power and feeds it to a processor 78. The processor 78 controls the voice coil control 65, which energizes the voice coil 64. The voice coil 64 actuates the head 40 to a completely off tape position, as illustrated in FIG. 6. The differential amplifier 60 now receives an on tape noise voltage, which is processed in the same way as the off tape noise voltage to the processor 78. The processor 78 makes a comparison between the off tape noise voltage and the on tape noise voltage, and divides it by an integer greater than 1, such as 2, to establish a reference noise voltage for positioning the MR element 46 with respect to the edge 22E of the moving magnetic tape. If the integer is 2, the MR element 46 will be positioned midway on the edge of the tape as illustrated in FIG. 8. The processor 78 can then utilize known information about distances of the tracks from the edge 22E to position the MR element to a desired track 22T, as illustrated in FIG. 10. The processor 78 also knows the width of the MR element, the distance between MR elements if the head has multi MR elements and the location of the aforementioned off tape and on tape locations. An exemplary flow diagram for the operation of the processor 78 is illustrated in FIG. 13. Detailed arrangements for processing are fully described in the aforementioned patents, which are incorporated by reference herein.

Figure 14:
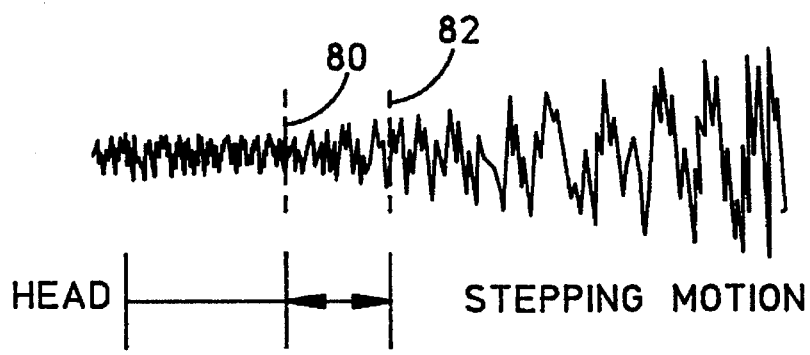
FIGS. 14, 15, and 16 are schematic illustrations of one or more noise signal configurations for determining the location of the edge of a magnetic tape according to the invention.
Figure 15:
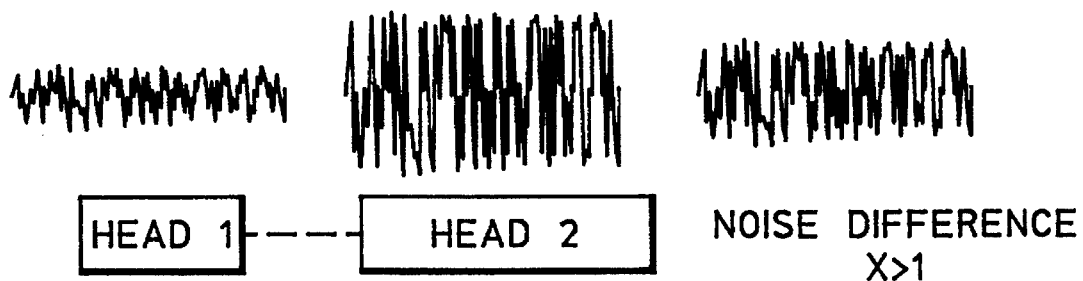
Figure 16:
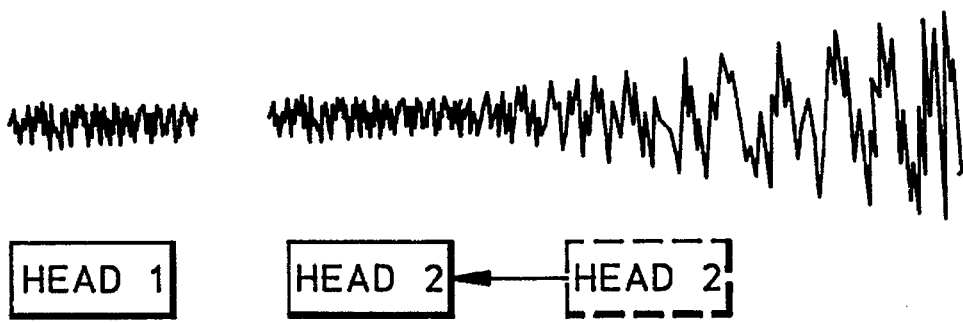

Other arrangements for employing the thermal noise generated by friction within an MR element are illustrated in FIGS. 14, 15, and 16. In FIG. 14, the MR element can be gradually moved toward the edge of the tape until the noise power starts to increase at location 80, after which it can be reversed in direction from some location 82 in small increments by a stepping motor back to location 80. This will correspond to a forward edge of the MR element being aligned with the edge of the tape. In FIG. 15, two heads can be employed with each head carrying an MR element. The heads, which are connected together, are positioned so that head one is completely off the tape and head two is completely on the tape. These thermal noise signals can then be subtracted and divided by an integer greater than 1 to establish a reference noise power, which can be employed to position the MR element relative to the edge of the tape according to the teachings of this invention. FIG. 16 is similar to FIG. 14 except the noise power measurements of the MR elements of the two heads are equalized to position the MR elements at known positions.

The present invention can be employed for a head having a single MR element or a head having multi-MR elements. After the reference position is detected a single MR element can be indexed to one or more desired tracks on a magnetic tape as explained hereinabove. After the reference position is detected there are several modes for a multi-MR element. One mode is for one of the MR elements to be dedicated to a reference position at the edge of the tape which places the other MR elements in position to read tracks, and another mode is for the multi-MR element head to be indexed to one or more positions on the magnetic tape.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

I claim:

1. A detector for finding a reference position of a transducer with respect to an edge of a magnetic medium of the type where the transducer and the magnetic medium are in frictional engagement when the magnetic medium is moved, the frictional engagement causing the transducer to produce a noise signal, the detector comprising:

the transducer;

signal producing means connected to the transducer for producing a noise signal in response to frictional engagement between the transducer and a moving magnetic medium;

positioning means connected to the signal producing means and coupled to the transducer for moving the transducer to a first position completely off the magnetic medium so that the signal producing means produces an off transducer noise signal and to a second position completely on the magnetic medium so that the signal producing means produces an on transducer noise signal; and a controller connected to the signal producing means for producing a reference noise signal which is at a noise level between the off transducer noise signal and the on transducer noise signal, the reference noise signal indicating a reference position of the transducer with respect to an edge of the magnetic medium.

2. A detector as claimed in claim 1 including:

the controller for producing a positioning signal corresponding to a desired position located on the magnetic medium relative to the reference position; and the positioning means connected to the controller for moving the transducer to the desired position.

3. A drive including the detector as claimed in claim 2, the drive further including:

means for moving the magnetic medium relative to the transducer; and a housing containing the detector and the means for moving the magnetic medium.

4. A detector as claimed in claim 2 wherein:

the positioning means indexes the transducer on the magnetic medium to an information track position which is a predetermined distance from said reference position.

5. A detector as claimed in claim 2 wherein the signal producing means includes:

a differential amplifier;

a band pass filter connected to the differential amplifier for passing slot noise; and an integrator connected to the band pass filter for summing the slot noise.

6. A detector as claimed in claim 2 wherein:

the reference position on the magnetic medium is where the signal producing means produces a noise signal level which is substantially 50% of the difference between a level of the off transducer noise signal and a level of the on transducer noise signal level.

7. A detector as claimed in claim 2 wherein the positioning means includes:

a voice coil and an actuator, the actuator being connected to the transducer and moving in response to energization of the voice coil; and voice coil control means connected to the controller and to the voice coil for energizing the voice coil with off transducer, on transducer and transducer indexing energization signals.

8. A detector as claimed in claim 2 including:

the magnetic medium being a magnetic tape; and the transducer including a magnetoresistive (MR) element.

9. A detector as claimed in claim 8 including:

a pair of leads connected to the MR element;

means connected to the leads for transmitting a sense current through the MR element; and the signal producing means including a differential amplifier connected across the leads for sensing voltage drops across the MR element due to resistance changes.

10. A detector as claimed in claim 9 wherein:

the positioning means indexes the transducer on the magnetic tape to an information track position which is a predetermined distance from said reference position.

11. A drive including the detector as claimed in claim 10, the drive further including:

means for moving the magnetic tape relative to the transducer; and a housing containing the detector and the means for moving the magnetic tape.

12. A detector as claimed in claim 10 wherein the signal producing means further includes:

a band pass filter connected to the differential amplifier for passing slot noise; and an integrator connected to the band pass filter for summing the slot noise.

13. A detector as claimed in claim 12 wherein:

the reference position on the magnetic tape is where the signal producing means produces a noise signal level which is substantially 50% of the difference between a level of the off transducer noise signal level and a level of the on transducer noise signal level.

14. A detector as claimed in claim 13 where the positioning means includes:

a voice coil and an actuator, the actuator being connected to the transducer and moving in response to energization of the voice coil; and voice coil control means connected to the controller and to the voice coil for energizing the voice coil with off transducer, on transducer and transducer indexing energization signals.

15. A drive including the detector as claimed in claim 14, the drive further including:

means for moving the magnetic tape relative to the transducer; and a housing containing the detector and the means for moving the tape.

16. A detector for finding a reference position of a magnetoresistive (MR) transducer with respect to an edge of a magnetic tape of the type where the MR transducer and the magnetic tape are in frictional engagement when the magnetic tape is moved, the frictional engagement causing the MR transducer to produce a noise signal, the detector comprising:

an MR transducer;

signal producing means connected to the MR transducer for producing a noise signal proportional to a noise voltage produced by the MR transducer;

a positioner coupled to the MR transducer for moving the MR transducer across the magnetic tape between a first tape edge and a second tape edge;

a control processor connected to the signal producing means and the positioner for producing a position signal to activate the positioner to move the MR transducer to an off tape position completely off the magnetic tape and for producing a signal to activate the positioner to move the MR transducer to an on tape position completely on the magnetic tape so that the signal producing means produces an off tape noise power signal at the off tape position and an on tape noise power signal at the on tape position respectively;

the control processor receiving the off tape noise power signal and the on tape noise power signal and dividing a difference between the two signals by an integer greater than one to provide a reference noise power signal to activate the positioner to move the MR transducer on tape to a reference position where the signal producing means produces a noise power signal which equals the reference noise power signal.

17. A detector as claimed in claim 16 wherein:

the control processor activates the positioner to index the MR transducer on the magnetic tape to a location which is a predetermined distance from said reference position.

18. A detector as claimed in claim 17 wherein:

the reference noise power is equal to substantially 50% of the difference between the off tape noise power and the on tape noise power produced by the signal producing means.

19. A detector as claimed in claim 18 wherein:

the positioner includes a voice coil and an actuator, the actuator being connected to the MR transducer and moving in response to energization of the voice coil; and the processor being connected to the voice coil for energizing the voice coil with off transducer, on transducer and transducer signals.

20. A drive including the detector as claimed in claim 19, the drive further including:

means for moving the magnetic tape relative to the MR transducer; and a housing containing the detector and the means for moving the magnetic tape.

21. A method for determining a reference position of a transducer with respect to an edge of a magnetic medium of the type where the transducer and the magnetic medium are in frictional engagement when the magnetic medium is moved, the frictional engagement causing thermal response in the transducer which can be employed to produce a noise signal, the method comprising: .

producing a noise signal which is proportional to a thermal resistance of the transducer;

moving the transducer completely off a magnetic medium to produce an off transducer noise signal;

moving the magnetic medium;

moving the transducer completely on the moving magnetic medium to produce an on transducer noise signal; and producing a reference noise signal by dividing the difference between the off transducer noise signal and the on transducer noise signal by an integer greater than one, the reference noise signal corresponding to said reference position.

22. A method as claimed in claim 21 including:

moving the transducer to a desired position on the magnetic medium which is indexed with respect to said reference position.

23. A method as claimed in claim 22 including:

said desired position being an information track or servo track on the magnetic medium.

24. A method as claimed in claim 23 including:

said integer being 2.

25. A method as claimed in claim 24 including:

the transducer including an MR element; and said magnetic medium being a magnetic tape.

26. A method as claimed in claim 25 wherein the step of producing a noise signal includes the steps of:

conducting a sense current through the MR element to produce a drop in voltage across the MR element which is proportional to the thermal response of the MR element;

detecting the drop in voltage across the MR element to produce a noise signal output;

filtering the noise signal output to produce a band pass slot noise output;

rectifying the slot noise output to produce a rectified slot noise output; and integrating the rectified noise slot output to produce said reference noise signal which corresponds to said reference position of the MR element on said magnetic tape.

* * * * *